United States Patent
Imanari et al.

(10) Patent No.: US 9,178,247 B2
(45) Date of Patent: Nov. 3, 2015

(54) LITHIUM COMPOSITE METAL OXIDE AND NONAQUEOUS ELECTROLYTE SECONDARY BATTERY

(75) Inventors: Yuichiro Imanari, Ibaraki (JP); Yoshihiro Kawakami, Ehime (JP); Yoshiaki Honda, Ibaraki (JP); Hiroshi Inukai, Ibaraki (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1749 days.

(21) Appl. No.: 12/440,246

(22) PCT Filed: Sep. 6, 2007

(86) PCT No.: PCT/JP2007/067776
§ 371 (c)(1),
(2), (4) Date: Mar. 6, 2009

(87) PCT Pub. No.: WO2008/032754
PCT Pub. Date: Mar. 20, 2008

(65) Prior Publication Data
US 2009/0280412 A1   Nov. 12, 2009

(30) Foreign Application Priority Data
Sep. 12, 2006   (JP) ................ 2006-246417

(51) Int. Cl.
*H01M 4/52* (2010.01)
*H01M 10/052* (2010.01)
*H01M 4/505* (2010.01)
*H01M 4/525* (2010.01)
*H01M 10/44* (2006.01)
*C01G 45/12* (2006.01)
*C01G 53/00* (2006.01)
*H01M 4/485* (2010.01)
*H01M 2/16* (2006.01)
*H01M 4/02* (2006.01)

(52) U.S. Cl.
CPC ......... *H01M 10/052* (2013.01); *C01G 45/1228* (2013.01); *C01G 53/42* (2013.01); *C01G 53/50* (2013.01); *H01M 2/1686* (2013.01); *H01M 4/485* (2013.01); *H01M 4/505* (2013.01); *H01M 4/525* (2013.01); *H01M 10/443* (2013.01); *C01P 2002/72* (2013.01); *C01P 2002/74* (2013.01); *C01P 2002/76* (2013.01); *C01P 2004/04* (2013.01); *C01P 2006/12* (2013.01); *C01P 2006/16* (2013.01); *C01P 2006/40* (2013.01); *H01M 2/1653* (2013.01); *H01M 2004/021* (2013.01); *Y02E 60/122* (2013.01)

(58) Field of Classification Search
CPC ....................................... H01M 4/52
See application file for complete search history.

(56) References Cited

U.S. PATENT DOCUMENTS

| 6,103,420 A | 8/2000 | Nakane et al. |
| 2002/0055036 A1* | 5/2002 | Shinohara et al. .............. 429/62 |
| 2006/0188780 A1 | 8/2006 | Fujii et al. |
| 2009/0011334 A1 | 1/2009 | Shizuka et al. |

FOREIGN PATENT DOCUMENTS

| JP | 8-37007 A | 2/1996 |
| JP | 2002-100356 A | 4/2002 |
| JP | 2005-97087 A | 5/2005 |
| JP | 2006-1781 A | 1/2006 |
| JP | 2006-117517 A | 5/2006 |
| JP | 2006-128135 A | 5/2006 |
| WO | 2006/085467 A | 8/2006 |

OTHER PUBLICATIONS

Sun Hee Choia, O.A. Shlyakhtinb, Joosun Kima, Young Soo Yoonc; Structural and electrochemical properties of Li1+xNi0.5Mn0.5O2+δ (0 ≤ x ≤ 0.7) cathode materials for lithium-ion batteries; Journal of Power Sources 140 (2005) 355-360.*
Naoaki Kumagai, Yoshimasa Koishikawa, Shinichi Komaba, and Nobuharu Koshiba, Thermodynamics and Kinetics of Lithium Intercalation into Nb2O5 Electrodes for a 2 V Rechargeable Lithium Battery, Journal of the Electrochemical Society, 146 (9) pp. 3203-3210 (1999) The Electrochemical Society.*
Japanese Office Action issued in JP Application No. 2007-228705, dated Sep. 18, 2012.
Chinese Office Action issued in CN Application No. 200780041841.5, dated Oct. 11, 2010.
Chinese Office Action issued in CN Application No. 200780041841.5, dated Feb. 28, 2012.
Chinese Office Action issued in CN Application No. 200780041841.5, dated Dec. 5, 2012.
Chinese Office Action issued in CN Application No. 200780041841.5, dated Jun. 7, 2013.
Supplementary European Search Report issued in EP Application No. 07807183.4, dated May 3, 2013.

* cited by examiner

Primary Examiner — Maria J Laios
(74) Attorney, Agent, or Firm — Sughrue Mion, PLLC

(57) ABSTRACT

The present invention provides a lithium composite metal oxide containing Li and at least one transition metal element, wherein at least one lithium composite metal oxide particle constituting the lithium composite metal oxide has both hexagonal and monoclinic crystal structures. Further, the present invention also provides a lithium composite metal oxide containing Li, Ni and M (where, M represents one or more kinds of transition metal elements selected from the group consisting of Mn, Co and Fe), having a diffraction peak (diffraction peak A) at an angle 2θ in a range from 20° to 23° in a powder X-ray diffraction pattern of a lithium composite metal oxide which is obtained by powder X-ray diffraction measurement made in the condition that CuKα is used as a radiation source and the measurement range of diffraction angle 2θ is in a range from 10° to 90°.

19 Claims, 5 Drawing Sheets

LITHIUM COMPOSITE METAL OXIDE AND NONAQUEOUS ELECTROLYTE SECONDARY BATTERY

TECHNICAL FIELD

The present invention relates to a lithium composite metal oxide and to a nonaqueous electrolyte secondary battery. Specifically, the present invention relates to a lithium composite metal oxide used for a positive electrode active material for a nonaqueous electrolyte secondary battery and to a nonaqueous electrolyte secondary battery.

BACKGROUND ART

Lithium composite metal oxides are used for the positive electrode active materials in nonaqueous electrolyte secondary batteries such as a lithium secondary battery. The lithium secondary batteries have been put to practical use as power sources for such as portable telephones and note book computers and attempts are made to further apply the lithium secondary batteries to middle or large scale applications such as automobile applications and power storage applications.

A lithium-nickel-manganese-M composite oxide (M is Fe, Co, Cr or Al) is disclosed in JP-A 2002-100356 as the lithium composite metal oxide to be used for the positive electrode active material of conventional lithium secondary batteries.

DISCLOSURE OF THE INVENTION

However, when a lithium secondary battery using a conventional positive electrode active material is subjected to a charge-discharge cycle test, the capacity retention of the battery is unsatisfactory. It is an object of the present invention to provide a nonaqueous electrolyte secondary battery which can exhibit high capacity retention and a lithium composite metal oxide useful for the nonaqueous electrolyte secondary battery.

The inventors of the present invention have made various studies and as a result, have found that the inventions described below meet the above objects, and have completed the present invention.

That is, the present invention provides the following inventions.

<1> A lithium composite metal oxide comprising Li and at least one transition metal element, wherein at least one lithium composite metal oxide particle constituting the lithium composite metal oxide has both hexagonal and monoclinic crystal structures.

<2> The lithium composite metal oxide according to the <1>, wherein the monoclinic crystal structure is a crystal structure belonging to the space group C2/m.

<3> The lithium composite metal oxide according to the <1> or <2>, wherein the hexagonal crystal structure is a crystal structure belonging to the space group R-3m.

<4> The lithium composite metal oxide according to any one of the <1> to <3>, wherein the amount (mol) of Li is 1.4 or more and 1.7 or less based on the total amount (mol) of the transition metal elements.

<5> The lithium composite metal oxide according to any one of the <1> to <4>, wherein the lithium composite metal oxide containing Li and at least one transition metal element is a lithium composite metal oxide comprising Li and at least one element selected from Ni, Co, Mn and Fe.

<6> The lithium composite metal oxide according to any one of the <1> to <5>, the lithium composite metal oxide containing Li and at least one transition metal element is a lithium composite metal oxide comprising Li, Ni and M (where, M represents one or more kinds of transition metal elements selected from the group consisting of Mn, Co and Fe).

<7> A lithium composite metal oxide comprising Li, Ni and M (where, M represents one or more kinds of transition metal elements selected from the group consisting of Mn, Co and Fe), having a diffraction peak (diffraction peak A) at an angle 2θ in a range from 20° to 23° in a powder X-ray diffraction pattern of a lithium composite metal oxide which is obtained by powder X-ray diffraction measurement made in the condition that CuKα is used as a radiation source and the measurement range of the diffraction angle 2θ is in a range from 10° to 90°.

<8> The lithium composite metal oxide according to the <7>, wherein the intensity of the diffraction peak A is 3 or more and 10 or less when the diffraction peak (diffraction peak B) having the maximum intensity is set to 100 in the powder X-ray diffraction pattern.

<9> The lithium composite metal oxide according to the <7> or <8>, having a hexagonal crystal structure and an a-axis lattice constant in Rietveld analysis of the crystal structure of 2.840 Å or more and 2.851 Å or less.

<10> The lithium composite metal oxide according to any one of the <6> to <9>, wherein the amount (mol) of Li is 1.4 or more and 1.7 or less based on the total amount (mol) of Ni and M.

<11> The lithium composite metal oxide according to any one of the <6> to <10>, wherein the amount (mol) of M exceeds 0 and 0.9 or less based on the total amount (mol) of Ni and M.

<12> The lithium composite metal oxide according to any one of the <6> to <11>, wherein the amount (mol) of Co is 0 or more and 0.4 or less based on the total amount (mol) of M.

<13> The lithium composite metal oxide according to any one of the <6> to <12>, wherein M is Mn and/or Co.

<14> The lithium composite metal oxide according to any one of the <6> to <13>, wherein M is Mn.

<15> A positive electrode active material for a nonaqueous electrolyte secondary battery comprising the lithium composite metal oxide of any one of the <1> to <14>.

<16> A positive electrode for a nonaqueous electrolyte secondary battery comprising the positive electrode material for a nonaqueous electrolyte secondary battery of the <15>.

<17> A nonaqueous electrolyte secondary battery comprising the positive electrode for a nonaqueous electrolyte secondary battery of the <16>.

<18> The nonaqueous electrolyte secondary battery according to the <17>, further comprising a separator.

<19> The nonaqueous electrolyte secondary battery according to the <18>, wherein the separator is made of a laminated porous film obtained by laminating a heat-resistant layer containing a heat-resistant resin and a shut-down layer containing a thermoplastic resin.

<20> A method for charging and discharging a nonaqueous electrolyte secondary battery, charging the nonaqueous electrolyte secondary battery as claimed in any one of the <17> to <19> at a voltage which reaches a maximum voltage ranging from 4.0 V to 5.0 V and discharging at a voltage which drops to a minimum voltage ranging from 2.0 V to 3.0 V at a temperature ranging from 40° C. to 70° C.

<21> The method for charging and discharging a nonaqueous electrolyte secondary battery of the <20>, charging and discharging the nonaqueous electrolyte secondary battery of any one of the <17> to <19> by a method including the following steps (1) and (2) at a temperature ranging from 40° C. to 70° C.:

(1) charging the nonaqueous electrolyte secondary battery at a voltage which reaches a maximum voltage ranging from 4.3 V to 4.8 V and discharging at a voltage which drops to a minimum voltage ranging from 2.0 V to 3.0 V; and (2) charging the nonaqueous electrolyte secondary battery at a voltage which reaches a maximum voltage ranging from 4.0 V to 4.4 V and discharging at a voltage which drops to a minimum voltage ranging from 2.0 V to 3.0 V.

<22> A nonaqueous electrolyte secondary battery charged and discharged by the method for charging and discharging a nonaqueous electrolyte secondary battery of the <20> or <21>.

The present invention provides a nonaqueous electrolyte secondary battery which is improved in capacity retention compared with a conventional secondary battery. Therefore, the present invention is very useful for nonaqueous electrolyte secondary batteries for which a high output is required particularly at a high current rate, that is, nonaqueous electrolyte secondary batteries for power tools such as automobile tools and power tools.

BEST MODE FOR CARRYING OUT THE INVENTION

Figure 1:
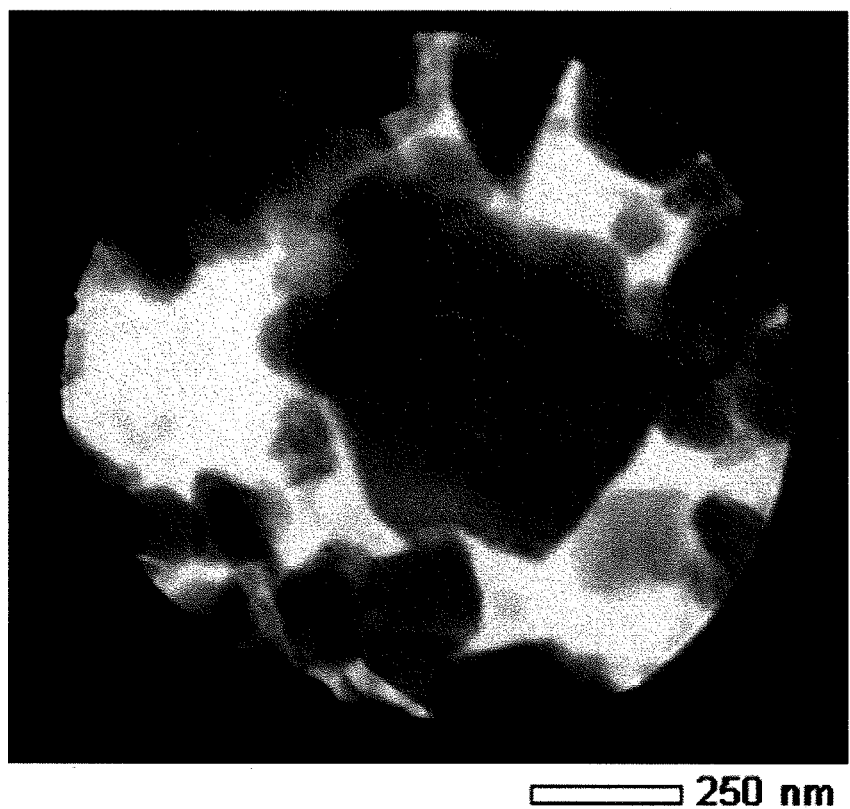
FIG. 1 is a TEM photograph (bright field image) of a powder in Example 1.

The present invention provides a lithium composite metal oxide containing Li and at least one transition metal element, wherein at least one lithium composite metal oxide particle constituting the lithium composite metal oxide has both hexagonal and monoclinic crystal structures.

Examples of the above hexagonal crystal structure include crystal structures belonging to space groups selected from P3, $P3_1$, $P3_2$, R3, P-3, R-3, P312, P321, $P3_1 12$, $P3_1 21$, $P3_2 12$, $P3_2 21$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_1 22$, $P6_5 22$, $P6_2 22$, $P6_4 22$, $P6_3 22$, P6mm, P6cc, $P6_3$cm, $P6_3$mc, P-6m2, P-6c2, P-62m, P-62c, P6/mmm, P6/mcc, $P6_3$/mcm and $P6_3$/mmc. The above hexagonal crystal structure is preferably a crystal structure belonging to a space group R-3m from the viewpoint of the discharge capacity of the obtained nonaqueous electrolyte secondary battery.

Examples of the above monoclinic crystal structure include crystal structures belonging to space groups selected from P2, $P2_1$, C2, Pm, Pc, Cm, Cc, P2/m, $P2_1$/m, C2/m, P2/c, $P2_1$/c and C2/c. The above monoclinic crystal structure is preferably a crystal structure belonging to a space group C2/m from the viewpoint of enhancing the capacity retention of the obtained nonaqueous electrolyte secondary battery.

In the present invention, it can be confirmed by the following (1) and (2) that one lithium composite metal oxide particle has both hexagonal and monoclinic crystal structures.

(1) First, the powder X-ray diffraction measurement of the lithium composite metal oxide is made in the condition that CuKα is used as a beam source and the measuring range of the diffraction angle 2θ is 1° to 90°. Based on this results, Rietveld analysis which will be described later is made to analyze the crystal structure of the lithium composite metal oxide, thereby determining the space group and lattice constant of the crystal structure.

(2) The lithium composite metal oxide particles are observed by a transmission type electron microscope (TEM observation) and the electron beam diffraction measurement of the particles is made to thereby be able to confirm that one lithium composite metal oxide particle has both hexagonal and monoclinic crystal structures. Specifically, based on data (distance from the center) of the diffraction points obtained by the electron beam diffraction measurement and on the lattice constant in the above (1), it is decided to which crystal surface the diffraction points are belonged in the space groups determined in the above (1) and a dark field image of each diffraction point is photographed, thereby making it possible to confirm that one lithium composite metal oxide particle has both hexagonal and monoclinic crystal structures (see, for example, "CRYSTAL ANALYSIS HANDBOOK", published on Sep. 10, 1999, edited by the Crystallographic Society of Japan).

Examples of the above at least one transition metal element include one or more kinds of elements selected from Ti, V, Cr, Mn, Fe, Co, Ni and Cu. The above lithium composite metal oxide containing Li and at least one transition metal element is preferably a lithium composite metal oxide containing Li and at least one element selected from Ni, Co, Mn and Fe and more preferably a lithium composite metal oxide containing Li, Ni and M (where, M represents one or more kinds of transition metal elements selected from Mn, Co and Fe) from the viewpoint of the discharge capacity of the obtained nonaqueous electrolyte secondary battery.

In the composition of the lithium composite metal oxide of the present invention, the compositions of Li and the transition metal element are as follows: the amount (mol) of Li usually exceeds 1.0 and less than 2.0, and is preferably 1.4 or more and 1.7 or less and more preferably 1.5 or more and 1.7 or less based on the total amount (mol) of the transition metal elements from the viewpoint of more improving the capacity retention.

Also, the prevent invention provides a lithium composite metal oxide containing Li, Ni and M (where, M represents one or more kinds of transition metal elements selected from Mn, Co and Fe), having a diffraction peak (diffraction peak A) at an angle 2θ in a range from 20° to 23° in a powder X-ray diffraction pattern of a lithium composite metal oxide which is obtained by powder X-ray diffraction measurement made in the condition that CuKα is used as a radiation source and the measurement range of the diffraction angle 2θ is in a range from 10° to 90°.

In the present invention, the above diffraction peak A means a diffraction peak having the maximum intensity at an angle 2θ in the range from 20° to 23°. In the case where the intensity of the diffraction peak A is less than 3 when the intensity of the diffraction peak (diffraction peak B) having the maximum intensity is set to 100 in the above powder X-ray diffraction pattern, such a lithium composite metal oxide is regarded as one having no diffraction peak A.

The intensity of the diffraction peak A is preferably 3 or more and 10 or less when the intensity of the diffraction peak B is set to 100 in the above powder X-ray diffraction pattern from the viewpoint of the discharge capacity of the nonaqueous electrolyte secondary battery.

Also, the lithium composite metal oxide of the present invention generally has a hexagonal crystal structure, and an a-axis lattice constant in the Rietveld analysis of the crystal structure is preferably in a range from 2.840 Å to 2.851 Å. When the a-axis lattice constant is in the above range, the capacity retention of the nonaqueous electrolyte secondary battery tends to be able to be made higher. Here, the Rietveld analysis is a technique for analyzing the crystal structure of a material by using data (diffraction peak strength, diffraction angle 2θ) of the diffraction peak in the powder X-ray diffraction measurement of the material (see, for example, "Actual Powder X-ray Analysis—Guide to Rietveld Method—published on Feb. 10, 2002, edited by the Japan Society for Analytical Chemistry X-ray Analysis Community").

With regard to the compositions of Li, Ni and M in the present invention, the amount (mol) of Li usually exceeds 1.0 and less than 2.0, preferably 1.4 or more and 1.7 or less and more preferably 1.5 or more and 1.7 or less based on the total amount (mol) of Ni and M with the view of more improving the capacity retention.

Further, with regard to the compositions of Ni and M in the present invention, it is preferable that the amount (mol) of M usually exceeds 0 and 0.9 or less, more preferably 0.4 or more and 0.9 or less and even more preferably 0.5 or more and 0.8 or less based on the total amount (mol) of Ni and M with the view of increasing the capacity retention.

Also, with regard to the composition of M in the present invention, it is preferable that the amount (mol) of Co is 0 or more and 0.4 or less, more preferably 0 or more and 0.35 or less and even more preferably 0 or more and 0.25 or less based on the total amount (mol) of M with the view of more increasing the capacity retention. Further, M is preferably Mn and/or Co from the viewpoint of improving in discharge capacity and M is more preferably Mn in consideration of cost. Also, when M contains Fe, the amount of Fe (mol) is preferably 0.01 or more or 0.5 or less and more preferably 0.05 or more and 0.3 or less based on the total amount (mol) of M from the viewpoint of discharge capacity.

Further, a part of Li, Ni, Co and Mn of the lithium composite metal oxide in the present invention may be substituted with elements such as B, Al, Ga, In, Si, Ge, Sn, Mg, Sc, Y, Ti, Zr, Hf, V, Nb, Ta, Cr, Mo, W, Tc, Ru, Rh, Ir, Pd, Cu, Ag, Ag, and Zn to an extent that the effect of the present invention is not impaired.

The BET specific surface area of the lithium composite metal oxide of the present invention is generally about 3 $m^2/g$ or more and about 30 $m^2/g$ or less. The BET specific surface area of the lithium composite metal oxide is preferably 4 $m^2/g$ or more and 20 $m^2/g$ or less and more preferably 5 $m^2/g$ or more and 16 $m^2/g$ or less with the view of obtaining a nonaqueous electrolyte secondary battery exhibiting higher output at high current rates.

The lithium composite metal oxide of the present invention may be used as a core material, and the surface of the particle is further coated with a compound containing one or more kinds of elements selected from B, Al, Ga, In, Si, Ge, Sn, Mg and transition metal elements. Among the above elements, one or more kinds of elements selected from B, Al, Mg, Ga, In and Sn are preferable and Al is more preferable from the viewpoint of operability. Examples of the compound include oxides, hydroxides, oxyhydroxides, carbonates, nitrates and organic acid salts of the above elements, or mixtures thereof. Among these compounds, oxides, hydroxides, oxyhydroxides and mixtures thereof are preferable. Among these compounds, alumina is more preferable.

Next, a method for producing the lithium composite metal oxide of the present invention will be described taking a case of producing a lithium composite metal oxide containing Li, Ni, and M (where M represents one or more kinds of transition metal elements selected from the group consisting of Mn, Co and Fe).

The lithium composite metal oxide of the present invention may be produced by a method of baking a metal compound mixture which can be made into the lithium composite metal oxide of the present invention by baking, that is, a solid phase reaction method. Specifically, when the molar ratio of Li:Ni:Mn:Co:Fe is 1: x:y:z:q in the composition of the lithium composite metal oxide of the present invention, the lithium composite metal oxide can be obtained by using a compound containing Li, a compound containing Ni, a compound containing Mn, a compound containing Co and a-compound containing Fe, weighing and mixing such that the molar ratio of Li:Ni:Mn:Co:Fe is A:x:y:z:q (where, A is a value ranging from 2 to 5) to obtain a metal compound mixture, and then baking the mixture at a temperature in a range from 800° C. to 1000° C. Here, A is preferably a value ranging from 2.1 to 3.5.

As the above compounds having each of metal elements of Li, Ni, Mn, Co and Fe, oxides may be used or hydroxides, oxyhydroxides, carbonates, nitrates, acetates, halides, oxalates, alkoxides and the like, which can be decomposed and/or oxidized to form oxides at high temperature, may be used. Among these compounds, hydroxides and/or carbonates are preferable as the compound containing Li, hydroxides and/or oxides are preferable as the compound containing Ni, carbonates and/or oxides are preferable as the compound containing Mn, oxides and/or hydroxides are preferable as the compound containing Co and oxides and/or hydroxides are preferable as the compound containing Fe. Also, a composite compound containing two or more kinds of the above metal elements may be used as a compound containing a metal element.

In order to increase the initial discharge capacity by improving the crystallinity of the lithium composite oxide, the above metal compound mixture prior to baking may further contain a compound containing boron. The content of the compound containing boron is 0.00001 mol % or more and 5 mol % or less and preferably 0.0001 mol % or more and 3 mol % or less in terms of boron based on the total mol of metal elements excluding lithium in the above metal compound mixture. Examples of the compound containing boron include boron oxide and boric acid and boric acid is preferable. Also herein, boron contained further in the metal compound mixture may be left in the lithium composite metal oxide of the present invention after baking or may be removed by washing, vaporization or the like.

Though any of the dry and wet mixing methods may be used for mixing the above compound containing a metal element, the simpler dry mixing method is preferable. As to a dry mixing apparatus, such as a V-type mixer, a W-type mixer, a ribbon mixer, a drum mixer or a dry ball mill can be used.

After the above metal compound mixture is compression-molded according to need, it is kept at a temperature ranging from 800° C. to 1000° C. for 2 to 30 hours to bake, thereby obtaining a lithium composite metal oxide. Further, as atmosphere for baking, air, oxygen, nitrogen, argon or mixture gases thereof may be used. An atmosphere containing oxygen is preferable.

Besides the above solid phase method, for example, the following hydrothermal reaction method, that is, a production method involving the following steps (1), (2), (3), (4) and (5) in this order may also be used to produce the lithium composite metal oxide of the present invention.

(1) A step of mixing an aqueous solution containing Ni and M with an alkali (A) to form a precipitate.

(2) A step of subjecting a liquid mixture containing the precipitate, an oxidant and an alkali (B) including LiOH to hydrothermal treatment at a temperature ranging from 150° C. to 350° C. to obtain a hydrothermally treated product.

(3) A step of washing the hydrothermally treated product to obtain a washed product.

(4) A step of drying the washed product to obtain a dry product.

(5) A step of baking a mixture obtained by mixing the dried product with a lithium compound by dry mixing to obtain a baked product.

In the step (1), it is only required that the aqueous solution containing Ni and M (where, M represents one or more kinds of transition metal elements selected from the group consisting of Mn, Co and Fe) contains Ni and M. When a water-soluble compound, such as a chloride, nitrate, sulfate, oxalate or acetate, which contains Ni and M is used as a raw material, it is only required that the compound is dissolved in water to produce the aqueous solution. These water-soluble compounds may be either anhydrides or hydrates. Also, when a metal material such as Ni and M or a compound containing Ni and M, such as a hydroxide, acid hydroxide or oxide, which is sparingly soluble in water is used as a raw material, it is only required that these compounds are each dissolved in an acid such as hydrochloric acid to produce the aqueous solution. Also, with regard to each of Ni and M, two or more kinds of the aforementioned water-soluble compounds, compounds which are sparingly soluble in water and metal materials may be used in combination.

As the alkali (A) in the step (1), one or more kinds of anhydrides and/or one or more kinds of hydrates selected from the group consisting of LiOH (lithium hydroxide), NaOH (sodium hydroxide), KOH (potassium hydroxide), $NH_3$ (ammonia), $Na_2CO_3$ (sodium carbonate), $K_2CO_3$ (potassium carbonate) and $(NH_4)_2CO_3$ (ammonium carbonate) may be used. Generally, these materials are dissolved in water and used in the form of an aqueous solution. The concentration of the alkali (A) in the aqueous solution is generally about 0.1 to 20 M and preferably about 0.5 to 10 M. Further, an anhydride and/or hydrate of LiOH is/are preferably used as the alkali (A) from the viewpoint of reducing impurities in the lithium composite metal oxide. Also, an anhydride and/or hydrate of KOH is/are preferably used as the alkali (A) from the viewpoint of production cost. Further, two or more of these alkalis (A) may be used in combination.

When the above aqueous solution containing Ni and M is mixed with the alkali (A) to form precipitates in the step (1), for example, a prescribed amount of an aqueous solution containing Ni and M in each prescribed concentration is added to a prescribed concentration of the alkali (A). In order to obtain precipitates having an even particle diameter, it is more preferable to add the aqueous solution containing Ni and M dropwise to an aqueous alkali (A) solution with stirring of the. In this case, measurement of the pH of the aqueous solution is started with stirring the aqueous alkali (A) solution. As the aqueous solution containing Ni and M is added dropwise, the measured pH tends to drop. However, the measured pH is preferably 11 or more in the step (1).

Also, the aqueous solution containing Ni and M and/or the aqueous alkali (A) solution may be cooled upon use with the view of uniformly producing precipitates. The temperature when this cooling is preferably 10° C. or less and more preferably about −15° C. or more and 5° C. or less. When it is intended to set the cooling temperature to 0° C. or less, an antifreeze solution such as methanol, ethanol or ethylene glycol may be added to the aqueous solution containing Ni and M and/or the aqueous alkali (A) solution in a ratio of 1 to 50 parts by weight based on 100 parts by weight of water.

The aqueous solution containing Ni and M may be added dropwise to the above aqueous alkali (A) solution while operating of introducing oxygen-containing gas such as air. In a case where the aqueous alkali (A) solution is added to the aqueous solution containing Ni and M, gas is preferably introduced into the aqueous solution containing Ni and M. Also, the gas introducing operation may be carried out after the both solutions are blended. The time required for the operation is 1 hour to 5 days and the temperature in the operation is about 0 to 100° C.

When a mixed solution including the produced precipitates by the mixing in the step (1) is subjected to solid-liquid separation such as filtration, a dispersion solution obtained by dispersing the precipitates obtained by the solid-liquid separation of the mixed solution again in water is used in the step (2). The precipitates obtained by the solid-liquid separation may be washed. Also, the mixed solution including the produced precipitates may be used as it is in the step (2) without carrying out the solid-liquid separation.

In the step (2), the liquid mixture contains the precipitates obtained in the step (1), an oxidant and an alkali (B) containing LiOH. The oxidant is used to oxidize metal elements in the liquid mixture. Examples of the oxidant may include one or more kinds selected from the group consisting of NaClO (sodium hypochlorite), $HNO_3$ (nitric acid), $KClO_3$ (potassium chlorite) and $H_2O_2$ (hydrogen peroxide). $H_2O_2$ and/or $KClO_3$ is/are preferable in view of production cost and oxidation reactivity and $KClO_3$ is more preferable with the view of making it easy to control the oxidation reaction. Also, the alkali (B) containing LiOH may contain only an anhydride and/or hydrate of LiOH, and further, an anhydride and/or hydrate of NaOH and an anhydride and/or hydrate of KOH, and preferably an anhydride and/or hydrate of KOH. These oxidant and alkali (B) can be added to the above mixed solution or dispersion solution to produce the liquid mixture. The concentration of the oxidant in the liquid mixture is generally about 0.1 to 10 M and preferably about 0.3 to 5 M. The content of the alkali (B) in the liquid mixture is generally about 0.1 to 30 M and preferably about 1 to 20 M. The concentration of the precipitate in the liquid mixture is generally about 1 to 200 g/(1 L of the liquid mixture). Also, the concentration of Li in the liquid mixture is set to 0.1 to 10 M and more preferably 0.5 to 5 M. The liquid mixture may contain lithium chloride, lithium nitrate and lithium carbonate according to need. Also, the pH of the liquid mixture is preferably 11 or more and more preferably 13 or more with the view of promoting the reaction in the hydrothermal treatment.

Using the above liquid mixture in the step (2), hydrothermal treatment is carried out at a temperature ranging from 150° C. to 350° C. to obtain a hydrothermally treated product. The pressure in this temperature range is generally about 0.4 MPa to 17 MPa. As a hydrothermal treating apparatus, an autoclave may be used. The temperature of the hydrothermal treatment is preferably in a range from 180° C. to 250° C. The time required for the hydrothermal treatment is generally about 0.1 to 150 hours and preferably 5 to 50 hours.

In the step (3), the hydrothermally treated product is washed. Impurities such as lithium hydroxide, lithium chloride, lithium nitrate, lithium carbonate and the oxidant in the hydrothermally treated product can be removed by this washing. In the washing, generally, the solid content obtained after the hydrothermally treated product is subjected to solid-liquid separation such as filtration is washed by water, wateralcohol, acetone or the like and then is subjected again to solid-liquid separation. The solid content obtained after the solid-liquid separation is a washed product.

In the step (4), the washed product is dried to obtain a dried product. Although this drying is generally carried out by heat treatment, it may be carried out by air drying or vacuum drying. When the drying is carried out by heat treatment, it is generally carried out at 50 to 300° C. and preferably about 100° C. to 200° C.

In the step (5), the above dried product is blended with a lithium compound by dry mixing to obtain a mixture, which is then baked, thereby obtaining a baked product. The baked product is the lithium composite metal oxide of the present invention. Examples of the lithium compound in the step (5) may include one or more kinds of anhydrides and/or one or more kinds of hydrates selected from the group consisting of lithium hydroxide, lithium chloride, lithium nitrate and lithium carbonate. One or more kinds of anhydrides and/or one or more kinds of hydrates selected from the group consisting of lithium hydroxide and lithium carbonate is/are preferable, provided that they are required to be in a solid state. The dried product is mixed with the lithium compound by dry mixing. Examples of the mixer may include such as a stirring mixer, a V-type mixer, a W-type mixer, a ribbon mixer, a drum mixer and a ball mill.

In the step (5), the baking temperature is preferably 300° C. or more and 1000° C. or less and more preferably 500° C. or more and 900° C. or less. The time required to keep the above mixture at the above baking temperature is usually 0.1 to 20 hours and preferably 0.5 to 8 hours. The temperature rise rate when the temperature of the mixture is raised up to the baking temperature is usually 50° C. to 400° C./hour and the temperature drop rate when the temperature of the mixture is dropped down to ambient temperature from the baking temperature is usually 10° C. to 400° C./hour. Also, as the baking atmosphere, air, oxygen, nitrogen, argon or a mixture of these gases may be used, and the oxygen-containing atmosphere is preferable.

The lithium composite metal oxide obtained by the solid phase reaction method or hydrothermal reaction method may be pulverized by using a ball mill, a jet mill or the like or may be subjected to milling and baking repeated two or more times. The lithium composite metal oxide to be obtained may be washed and classified according to need.

The lithium composite metal oxide of the present invention obtained in the above manner is the positive electrode active material for a nonaqueous electrolyte secondary battery of the present invention.

Next, a positive electrode for a nonaqueous electrolyte secondary battery provided with the positive electrode active material for a nonaqueous electrolyte battery of the present invention will be described.

The positive electrode for a nonaqueous electrolyte secondary battery is produced by making a positive electrode current collector carry a positive electrode mixture including a positive electrode active material, a conductive material and a binder. As the above conductive material, a carbonaceous material may be used. Examples of the carbonaceous material may include such as a graphite powder, carbon black, acetylene black and a fibrous carbon material. Because carbon black and acetylene black are microparticles and therefore have a large surface area, the conductivity of the inside of the positive electrode can be improved, leading to improvements in charge-discharge efficiency and rate characteristics by adding a small amount of these materials to the positive electrode mixture. However, if these materials are added excessively, the adhesiveness between the positive electrode mixture and the positive electrode current collector through a binder is lowered, which is rather a cause of an increase in internal resistance. Generally, the ratio of the conductive material in the positive electrode mixture is 5 parts by weight or more and 20 parts by weight or less based on 100 parts by weight of the positive electrode active material. When fibrous carbon materials such as graphitized carbon fibers or carbon nanotubes are used as the conductive material, the ratio may be lowered.

As the above binder, a thermoplastic resin may be used. Specific examples of the binder include fluororesins such as a polyvinylidene fluoride (hereinafter sometimes referred to as "PVDF"), polytetrafluoroethylene (hereinafter sometimes referred to as "PTFE"), an ethylene tetrafluoride/propylene hexafluoride/vinylidene fluoride type copolymer, a propylene hexafluoride/vinylidene fluoride type copolymer and an ethylene tetrafluoride/perfluorovinyl ether type copolymer and polyolefin resins such as a polyethylene and polypropylene, and the like. Also, two or more kinds of these resins may be combined. Also, a fluororesin and a polyolefin resin are used as the binder and are contained in ratios of 1 to 10% by weight and 0.1 to 2% by weight respectively based on the positive electrode mixture, thereby making it possible to obtain a positive electrode mixture which is excellent in adhesiveness to the positive electrode current collector.

As the above positive electrode current collector, Al, Ni, stainless or the like may be used, and Al is preferable in view of easy processability into a film and low cost. Examples of methods for making the positive electrode current collector carry the positive electrode mixture include a method using pressure molding and a method in which the positive electrode mixture is dissolved in an organic solvent to form a paste, which is then applied onto the positive electrode current collector and dried, followed by pressing to fix. When forming the paste, a slurry composed of a positive electrode active material, a conductive material, a binder and an organic solvent is produced. Examples of the organic solvent include amine type solvents such as N,N-dimethylaminopropylamine and diethylenetriamine, ether type solvents such as tetrahydrofuran, ketone type solvents such as methyl ethyl ketone, ester type solvents such as methyl acetate and amide type solvents such as dimethylacetamide and 1-methyl-2-pyrrolidone, and the like.

Examples of methods for applying the positive electrode mixture to the positive electrode current collector include such as a slit-die coating method, a screen coating method, a curtain coating method, a knife coating method, a gravure coating method and an electrostatic spraying method. Using each of these methods, the positive electrode for a nonaqueous electrolyte secondary battery can be produced.

The above positive electrode for a nonaqueous electrolyte secondary battery may be used to manufacture a nonaqueous electrolyte secondary battery in the following manner. Specifically, a separator, a negative electrode obtained by carrying a negative electrode mixture on a negative electrode current collector and the above positive electrode are laminated and wound to obtain an electrode group, which is put into a battery can and then impregnated with an electrolytic solution constituted of an organic solvent containing an electrolyte, thereby making it possible to produce a nonaqueous electrolyte secondary battery.

Examples of the shape of the above electrode group may include shapes in which a cross section forms, for example, a circle, an ellipse, a rectangle and a rectangle with round corners when the electrode group is cut in a direction perpendicular to the winding axis. Also, examples of the shape of the battery may include a paper type, a coin type, a cylinder type and an angular type.

As the above negative electrode, a negative electrode obtained by making the negative electrode current collector carry the negative electrode mixture containing a material capable of doping and dedoping lithium ions, or a lithium metal or lithium alloy. Specific examples of the material capable of doping and dedoping lithium ions include carbonaceous materials such as natural graphite, artificial graphite, cokes, carbon black, pyrolytic carbons, carbon fibers and burned products of organic polymeric compounds. Chalcogen compounds which can dope and dedope lithium ions at a lower potential than the positive electrode such as oxides and sulfides may also be used. As the carbonaceous material, those containing graphite such as natural graphite and artificial graphite as their major components may be used from the viewpoint of a high potential flat characteristic and a low average discharge potential. The carbonaceous material may have any of a flake form like that of natural graphite, a sphere form like that of mesocarbon microbeads, a fiber form like that of graphitized carbon fibers and a form of fine powder coagulates. If a negative electrode mixture containing polyethylene carbonate is used in a case where the aforementioned electrolytic solution does not contain ethylene carbonate described later, there is a case where the cycle characteristics and large-current discharge characteristics of the resulting battery are improved.

The above negative electrode mixture may contain a binder according to need. Examples of the binder may include thermoplastic resins. Specific examples of the thermoplastic resins may include PVDF, thermoplastic polyimide, carboxymethyl cellulose, polyethylene and polypropylene.

Further, examples of the chalcogen compounds such as oxides and sulfides which are to be contained in the negative electrode mixture and are used as the materials capable of doping and dedoping lithium ions include chalcogen compounds such as crystal or amorphous oxides and sulfides primarily containing the XIII, XIV or XV group elements in the periodic pattern. Specific examples of these chalcogen compounds include such as amorphous compounds mainly containing tin oxides. These compounds may contain a carbonaceous material as the conductive material according to need.

Examples of the above negative electrode current collector may include such as Cu, Ni and stainless. Cu is preferably used in the point that it scarcely forms an alloy with lithium and is easily processed into a thin film. A method for making the negative electrode current collector carry the negative electrode mixture is the same as that of the positive electrode. Examples of this method include a method using pressure molding and a method in which the positive electrode mixture is dissolved in an organic solvent to form a paste, which is then applied to the positive electrode current collector and dried, followed by pressing to fix.

As the above separator, materials having forms such as a porous film, a nonwoven fabric and a woven fabric made of a polyolefin resin such as polyethylene or polypropylene, a fluororesin or a nitrogen-containing aromatic polymer may be used. Also, two or more kinds of the above materials may be used to form a separator or the above materials may be laminated. Examples of the separator may include the separators described in, for example, JP-A Nos. 2000-30686 and 10-324758. The thickness of the separator is preferably made to be thinner as long as the mechanical strength of the separator is kept from the viewpoint of increasing the volume energy density of a battery and the internal resistance is small and is usually about 10 to 200 μm and preferably about 10 to 30 μm.

In the nonaqueous electrolyte secondary battery, it is usually important to cut off current, thereby protecting the battery against excessive current (shut down) when unusual current flows caused by, for example, short circuits across the positive and negative electrodes in the battery. It is demanded that the separator be shut down at a low temperature as much as possible (clogs micropores of the porous film) when the temperature exceeds the usual working temperature, and even if the temperature inside of the battery is raised to a certain high temperature after shut-down, the separator keep the shut-down state without any breakdown of the film at that temperature, in other words, have high heat resistance. The use of the separator made of a laminated porous film obtained by laminating a heat-resistant layer containing a heat-resistant resin and a shut-down layer containing a thermoplastic resin can improve a high capacity retention effect of the nonaqueous electrolyte secondary battery of the present invention.

Hereinafter, the separator made of a laminated porous film obtained by laminating a heat-resistant layer containing a heat-resistant resin and a shut-down layer containing a thermoplastic resin will be described.

Examples of the heat-resistant resin in the above laminated porous film may include polyamide, polyimide, polyamideimide, polycarbonate, polyacetal, polysulfone, polyphenyl sulfide, polyether ether ketone, aromatic polyester, polyether sulfone and polyether imide. Among these compounds, polyamide, polyimide, polyamideimide, polyether sulfone and polyether imide are preferable and polyamide, polyimide and polyamideimide are more preferable from the viewpoint of more improving the heat resistance. Nitrogen-containing aromatic polymers such as an aromatic polyamide (para-oriented aromatic polyamide and meta-oriented aromatic polyamide), aromatic polyimide and aromatic polyamideimide are s more preferable, and aromatic polyamide is still more preferable and para-oriented aromatic polyamide (hereinafter sometimes referred to as "para-aramide") is particularly more preferable in view of production. Further, examples of the heat-resistant resin may also include a poly-4-methylpentene-1 and cyclic olefin type polymers. When these heat-resistant resins are used, the heat resistance can be improved, that is, the thermally breaking temperature of the film can be raised.

The thermally breaking temperature of the film is generally 160° C. or more though it depends on the type of heat-resistant resin. The thermally breaking temperature of the film can be raised to a maximum of about 400° C. by using the above nitrogen-containing aromatic polymer as the heat-resistant resin. Also, the thermally breaking temperature of the film can be raised to a maximum of about 250° C. when using poly-4-methylpentene-1 and to a maximum of about 300° C. when using a cyclic olefin type polymer, respectively.

The above para-aramide is obtained by the condensation polymerization of a para-oriented aromatic diamine and a para-oriented aromatic dicarboxylic acid halide and is constituted substantially of a repeat unit in which the amide bonds are connected at the para-position of the aromatic ring or in an orientation according to the para-position (for example, an orientation in which the amide bonds extend in directions opposite to each other on the same axis or in parallel as shown in, for example, 4,4'-biphenylene, 1,5-naphthalene and 2,6-naphthalene). Specific examples of the para-aramide include para-aramides having a structure of a para-orientation or an orientation according to the para-orientation, such as a poly(paraphenyleneterephthalamide), poly(parabenzamide, poly(4,4'-benzanilidoterephthalamide), poly(paraphenylene-4,4,-biphenylenedicarboxylic acid amide), poly(paraphenylene-2,6-naphthalenedicarboxylic acid amide), poly(2-chloro-paraphenyleneterephthalamide) and a paraphenyleneterephthalamide/2,6-dichloroparaphenyleneterephthalamide copolymer).

As the above aromatic polyimide, all-aromatic polyimide manufactured by the condensation polymerization between an aromatic diacid anhydride and a diamine is preferable. Specific examples of the diacid anhydride include such as pyromellitic acid di-anhydride, 3,3',4,4'-diphenylsulfonetetracarboxylic acid di-anhydride, 3,3',4,4'-benzophenonetetracarboxylic acid di-anhydride, 2,2'-bis(3,4-dicarboxyphenyl) hexafluoropropane and 3,3',4,4'-biphenyltetracarboxylic acid di-anhydride. Specific examples of the diamine include oxydianiline, paraphenylenediamine, benzophenonediamine, 3,3'-methylenedianiline, 3,3'-diaminobenzophenone, 3,3'-diaminodiphenylsulfone and 1,5'-naphthalenediamine. Also, polyimide soluble in a solvent may be preferably used. Examples of the polyimide include polyimides which are polymerization condensates of 3,3',4,4'-diphenylsulfonetetracarboxylic acid di-anhydride and an aromatic diamine.

Examples of the above aromatic polyamideimide include such as those obtained by using aromatic dicarboxylic acid and aromatic diisocyanate and condensation-polymerizing these compounds and those obtained by using aromatic diacid anhydride and aromatic diisocyanate and by condensation-polymerizing these compounds. Specific examples of the aromatic dicarboxylic acid include such as isophthalic acid and terephthalic acid. Also, specific examples of the aromatic diacid anhydride include such as trimellitic acid anhydride. Specific examples of the aromatic diisocyanate include such as 4,4'-diphenylmethanediisocyanate, 2,4-tolylenediisocyanate, 2,6-tolylenediisocyanate, orthotolylenediisocyanate and m-xylenediisocyanate.

Further, as to the thickness of a heat-resistant layer, it is preferably a thin layer having a thickness of 1 µm or more and 10 µm or less, more preferably 1 µm or more and 5 µm or less and particularly preferably 1 µm or more and 4 µm or less in view of more improving the ion-transmittance. Furthermore, the heat-resistant layer has micropores having a size (diameter) of usually 3 µm or less and preferably 1 µm or less. Also, the heat-resistant layer may also contain a filler which will be described later.

The shut-down layer in the above laminated porous film contains a thermoplastic resin. The shut-down layer has micropores like the above heat-resistant layer and each of these micropores has a size of usually 3 µm or less and preferably 1 µm or less. The porosity of the shut-down layer is generally 30 to 80% by volume and preferably 40 to 70% by volume. When the temperature in the nonaqueous electrolyte secondary battery exceeds the usual working temperature, the shut-down layer has a role of clogging the micropores because of softening of the thermoplastic resin composing thereof.

Examples of the above thermoplastic resin may include those softened at 80 to 180° C., and those insoluble in the electrolytic solution used in the nonaqueous electrolyte secondary battery may be selected. Specific examples of the thermoplastic resin may include polyolefins such as polyethylene and polypropylene and thermoplastic polyurethane. A mixture of two or more kinds of these resins may be used. Polyethylene is preferable with the view of softening it at lower temperatures to shut down. Examples of the polyethylene may include such as polyethylenes such as low-density polyethylene, high-density polyethylene, linear polyethylene, and may also include ultra high molecular weight polyethylene. The thermoplastic resin preferably contains at least ultra high molecular weight polyethylene from the viewpoint of improving the piercing strength of the shut-down layer. Further, there is a case where the thermoplastic resin preferably contains wax constituted of a low-molecular weight (weight average molecular weight: 10000 or less) polyolefin in view of producing the shut-down layer.

Also, the thickness of the shut-down layer is usually 3 to 30 µm and preferably 5 to 20 µm. Also, the separator used in the present invention is produced by laminating the heat-resistant layer and the shut-down layer and has a thickness of usually 20 µm or less and preferably 10 µm or less. Also, when the thickness of the heat-resistant layer is set to A (µm) and the thickness of the shut-down layer is set to B (µm), the ratio A/B is preferably 0.1 or more and 1 or less.

Also, the above heat-resistant layer may contain one or more kinds of fillers. The material of the filler may be selected from any of organic powders, inorganic powders and mixtures of these powders. The particles constituting the filler preferably have an average particle diameter of 0.01 µm or more and 1 µm or less.

Examples of the above organic powder include powders constituted of organic materials, for example, homopolymers of styrene, vinyl ketone, acrylonitrile, methylmethacrylate, ethylmethacrylate, glycidylmethacrylate, glycidylacrylate and methylacrylate or copolymers of two or more kinds of these monomers, fluororesins such as polytetrafluoroethylene, an ethylene tetrafluoride-propylene hexafluoride copolymer, an ethylene tetrafluoride-ethylene copolymer and polyvinylidene fluoride; melamine resins; urea resins; polyolefins; and polymethacrylates. These organic powders may be used either singly or in combinations of two or more kinds. Among these organic powders, a polytetrafluoroethylene powder is preferable in view of chemical stability.

Examples of the above inorganic powder include powders made of inorganic materials such as a metal oxide, metal nitride, metal carbide, metal hydroxide, carbonate and sulfate. Specific examples of the inorganic powder include powders constituted of such as alumina, silica, titanium dioxide and calcium carbonate. These inorganic powders may be used either singly or in combinations of two or more kinds. Among these inorganic powders, an alumina powder is preferable in view of chemical stability. Here, all particles constituting the filler are preferably alumina particles and in a more preferable embodiment, all particles constituting the filler are alumina particles and a part or all of these particles are alumina particles having almost a spherical form.

With regard to the content of the filler in the heat-resistant layer, the weight of the filler is usually 20 or more and 95 or less and preferably 30% by weight or more and 90% by weight or less when the total weight of the heat-resistant layer is 100 in a case where, for example, all the particles constituting the filler are alumina particles, though it depends on the specific gravity of the material of the filler. These ranges may be designed appropriately according to the specific gravity of the material of the filler.

Examples of the shape of the filler include a substantially spherical form, a plate form, a columnar form, a needle form, a whisker form and a fiber form. Although particles having any of these forms may be used, particles having a substantially spherical form are preferable from the viewpoint of forming even pores easily.

In the present invention, the separator has an air permeability of, preferably 50 to 300 sec/100 cc and more preferably 50 to 200 sec/100 cc when measured by the Gurley method from the viewpoint of ion transmittance. Also, the porosity of the separator is usually 30 to 80% by volume and preferably 40 to 70% by volume.

Examples of the electrolyte in the above electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lithium salt of lower aliphatic carboxylic acid and $LiAlCl_4$. A mixture of two or more kinds of these compounds may be used. Generally, an electrolyte containing at least one type selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$.

As the organic solvent in the above electrolytic solution, carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; and sulfur-containing compounds such as sulfolane, dimethylsulfoxide and 1,3-propane sultone or those obtained by further introducing a fluorine substituent into the above organic solvents may be used and, usually, two or more kinds of these solvents are mixed upon use. Among these solvents, a mixed solvent containing carbonates is preferable, and a mixed solvent of cyclic carbonate and non-cyclic carbonate or a mixed solvent of cyclic carbonate and ethers is more preferable. As the mixed solvent of cyclic carbonate and non-cyclic carbonate, mixed solvents containing ethylene carbonate, dimethyl carbonate and ethylmethyl carbonate are preferable in the point that each of these solvents has a wide working temperature range, is superior in load characteristics and is scarcely decomposed even in a case of using a graphite material such as natural graphite and artificial graphite as the negative electrode active material. Also, it is preferable to use an electrolytic solution containing a lithium salt containing fluorine such as $LiPF_6$, and a fluorine substituent from the viewpoint of obtaining a particularly superior effect on an improvement in safety. A mixed solvent containing ethers having a fluorine substituent such as pentafluoropropyl methyl ether and 2,2,3,3,-tetrafluoropropyl difluoromethyl ether and dimethyl carbonate is also superior in large-current discharge characteristics and is hence more preferable.

A solid electrolyte may also be used in place of the above electrolytic solution. As the solid electrolyte, polymer electrolytes such as polyethylene oxide type high-molecular compounds and high-molecular compounds containing one or more kinds of a polyorganosiloxane chain or polyoxyalkylene chain may be used. Also, the so-called gel type in which a nonaqueous electrolytic solution is carried on a polymer may be used. Also, if a sulfide electrolyte such as $Li_2S-SiS_2$, $Li_2S-GeS_2$, $Li_2S-P_2S_5$ and $Li_2S-B_2S_3$, or an inorganic compound electrolyte containing sulfides such as $Li_2S-SiS_2-Li_3PO_4$ and $Li_2S-SiS_2-Li_2SO_4$ is used, there is a case where the safety of the battery can be more improved. Also, when a solid electrolyte is used in the nonaqueous electrolyte secondary battery of the present invention, there is a case where the solid electrolyte functions as the separator, and in this case, the separator is not necessarily required.

In the nonaqueous electrolyte secondary battery of the present invention obtained in the above manner, a charge-discharge method carried out to more improve the capacity retention is a method preferably involving charging at a voltage which reaches a maximum voltage ranging from 4.0 V to 5.0 V and discharging at a voltage which drops to a minimum voltage ranging from 2.0 V to 3.0 V at a temperature ranging from 40° C. to 70° C., and more preferably involving charging and discharging in the following method including steps (1) and (2) in this order at a temperature ranging from 40° C. to 70° C. In this regard, the step (1) may be carried out two or more times.

(1) The nonaqueous electrolyte secondary battery is made to charge at a voltage that reaches a maximum voltage ranging from 4.3 V to 4.8 V and to discharge at a voltage that drops to a minimum voltage ranging from 2.0 V to 3.0 V.

(2) The nonaqueous electrolyte secondary battery is made to charge at a voltage that reaches a maximum voltage ranging from 4.0 V to 4.4 V and to discharge at a voltage that drops to a minimum voltage ranging from 2.0 V to 3.0 V.

In the present invention, there is a case where the nonaqueous electrolyte secondary battery charged and discharged in the above charge-discharge method is allowed to have higher electric capacitance, and therefore, this battery is a preferable embodiment.

Next, the present invention will be described in more detail by way of examples. In this regard, the evaluation and charge-discharge test of the lithium composite metal oxide (positive electrode active material) were made in the following manner.

1. Charge-discharge Test

A 1-methyl-2-pyrrolidone (hereinafter, also referred to as NMP) solution of PVDF was added as a binder to a mixture of a positive electrode active material and acetylene black used as a conductive material so as to have the composition of active material:conductive material:binder=86:10:4 (ratio by weight) and the mixture was kneaded to form a paste. The paste was applied to a #200 stainless mesh to be a current collector, which was dried under vacuum at 150° C. for 8 hours to obtain a positive electrode.

The obtained positive electrode was combined with an electrolytic solution obtained by dissolving $LiPF_6$ in a mixed solution of ethylene carbonate (hereinafter sometimes referred to as EC) and ethylmethyl carbonate (hereinafter sometimes referred to as EMC) of 50:50 (volume ratio) so as to be an amount of 1 mol/l (hereinafter sometimes referred to as $LiPF_6$/EC+EMC), a polypropylene porous film used as a separator and metal lithium used as a negative electrode to manufacture a plate type battery.

The above plate type battery was used to make a charge-discharge test including constant current-constant voltage charge and constant current discharge with keeping the battery at 60° C. in the following charge-discharge condition 1 and charge-discharge condition 2. The charge-discharge test cycle was repeated to measure the discharge capacity of the battery after prescribed number of cycles, thereby calculating the capacity retention of the battery according to the following procedures.

<Charge-discharge Condition 1>

Maximum charge voltage: 4.3 V, charge time: 8 hours, charge current: 0.4 mA/cm², minimum discharge voltage: 3.0 V, and discharge current: 0.4 mA/cm².

<Charge-discharge Condition 2>

In the 1st and 2nd cycles, maximum charge voltage: 4.5 V, charge time: 8 hours, charge current: 0.6 mA/cm² minimum discharge voltage: 3.0 V, and discharge current: 0.6 mA/cm². The 3rd cycle or later, maximum charge voltage: 4.3 V, charge time: 8 hours, charge current: 0.6 mA/cm², minimum discharge voltage: 3.0 V, and discharge current: 0.6 mA/cm².

<Capacity Retention>

Capacity retention (%)=Discharge capacity after prescribed cycles/Initial discharge capacity×100

2. Measurement of the Bet Specific Surface Area of the Lithium Composite Metal Oxide After 1 g of a powder was dried at 150° C. under a nitrogen atmosphere for 15 minutes, the BET specific surface area was measured using Flowsoab II2300 manufactured by Micrometrix Corporation.

3. Analysis of the Composition of the Lithium Composite Metal Oxide

After a powder was dissolved in hydrochloric acid, the composition was measured by using an induction coupling plasma emission analysis method (SPS 3000, hereinafter sometimes referred to as ICP-AES).

4. Powder X-ray Diffraction Measurement of the Lithium Composite Metal Oxide The powder X-ray diffraction measurement of the lithium composite metal oxide was made by a RINT 2500 TTR model manufactured by Rigaku Corporation. The measurement was made by filling the lithium composite metal oxide in a dedicated substrate and by using a CuKα radiation source at a diffraction angle 2θ ranging from 10° to 90° to obtain a powder X-ray diffraction pattern. Also, Rietveld analysis was made using an analysis program RIETAN-2000 (see, F. Izumi and T. Ikeda, Mater. Sci. Forum, 321-324 (2000) 198) to find the space group and lattice constant of the crystal structure of the lithium composite metal oxide.

5. TEM Observation of the Lithium Composite Metal Oxide Particles and Electron Beam Diffraction Measurement of the Particles The TEM observation and electron beam diffraction measurement of the particles were made using a measuring device (EF-TEM JEM2200FS, manufactured by JEOL Ltd.). Specifically, the lithium composite metal oxide was placed on a Cu mesh with support film and electron beams were irradiated at an accelerated voltage of 200 kV to carry out electron beam diffraction measurement and TEM observation (photographing of a bright-field image and a dark-field image). It was confirmed that one lithium composite metal oxide particle had a hexagonal crystal structure (for example, a crystal structure belonging to the space group R-3m) and a monoclinic crystal structure (for example, a crystal structure belonging to the space group C2/m) by the above method.

COMPARATIVE EXAMPLE 1

1. Production of a Lithium Composite Metal Oxide

Using 50 g of lithium hydroxide monohydrate, 500 ml of distilled water and 200 ml of ethanol, and a mixture of these components was stirred in a titanium beaker to completely dissolve the lithium hydroxide monohydrate, thereby preparing an aqueous lithium hydroxide solution. The titanium beaker including the aqueous lithium hydroxide solution was stationarily placed in a low-temperature thermostat and kept at −10° C. Using 23.17 g of nickel (II) chloride hexahydrate, 23.25 g of manganese (II) chloride tetrahydrate, 7.28 g of cobalt (II) nitrate hexahydrate (molar ratio of Ni:Mn:Co=0.41:0.49:0.10) and 500 ml of distilled water, a mixture of these components was stirred in a glass beaker to completely dissolve the metal salts of nickel (II) chloride hexahydrate, manganese (II) chloride tetrahydrate and cobalt (II) nitrate hexahydrate to obtain an aqueous nickel-manganese-cobalt solution. The aqueous solution was added dropwise to the aqueous lithium hydroxide solution kept at −10° C. to produce precipitates.

The mixed solution containing the produced precipitates was then taken out of the low-temperature thermostat and an operation (bubbling) of blowing air was carried out for one day. The mixed solution obtained after the bubbling operation was subjected to filtration and washed with distilled water to obtain precipitates.

Using 50 g of lithium hydroxide monohydrate, 50 g of potassium chlorate, 309 g of potassium hydroxide and 500 ml of distilled water, a mixture of these components was stirred in a polytetrafluoroethylene beaker and the precipitates obtained above were added to the mixture, which was then further stirred to disperse the precipitates to obtain a liquid mixture.

The polytetrafluoroethylene beaker containing the liquid mixture was stationarily placed in an autoclave and the liquid mixture was hydrothermally treated at 220° C. for 5 hours and the obtained reaction solution was naturally cooled to obtain a hydrothermally treated product. The hydrothermally treated product was taken out of the autoclave, and was subjected to decantation using distilled water to obtain a washed product.

This washed product was mixed with an aqueous lithium hydroxide solution obtained by dissolving 10.49 g of lithium hydroxide monohydrate in 100 ml of distilled water and the mixture was dried at 100° C. to obtain a mixture. Then, the mixture was pulverized by using an agate mortar to obtain a powder, which was then placed in an alumina burning container, followed by baking at 800° C. in the air for 6 hours by using an electric furnace. The baked product was cooled to room temperature, pulverized and washed by decantation using distilled water, followed by filtration and the obtained residue was dried at 100° C. for 8 hours to obtain a powder $A_1$.

As a result of the analysis of the composition of the powder $A_1$, it was found that the molar ratio of Li:Ni:Mn:Co was 1.34:0.41:0.49:0.10. Also, the BET specific surface area of $A_1$ was 6.4 $m^2/g$.

Figure 4:
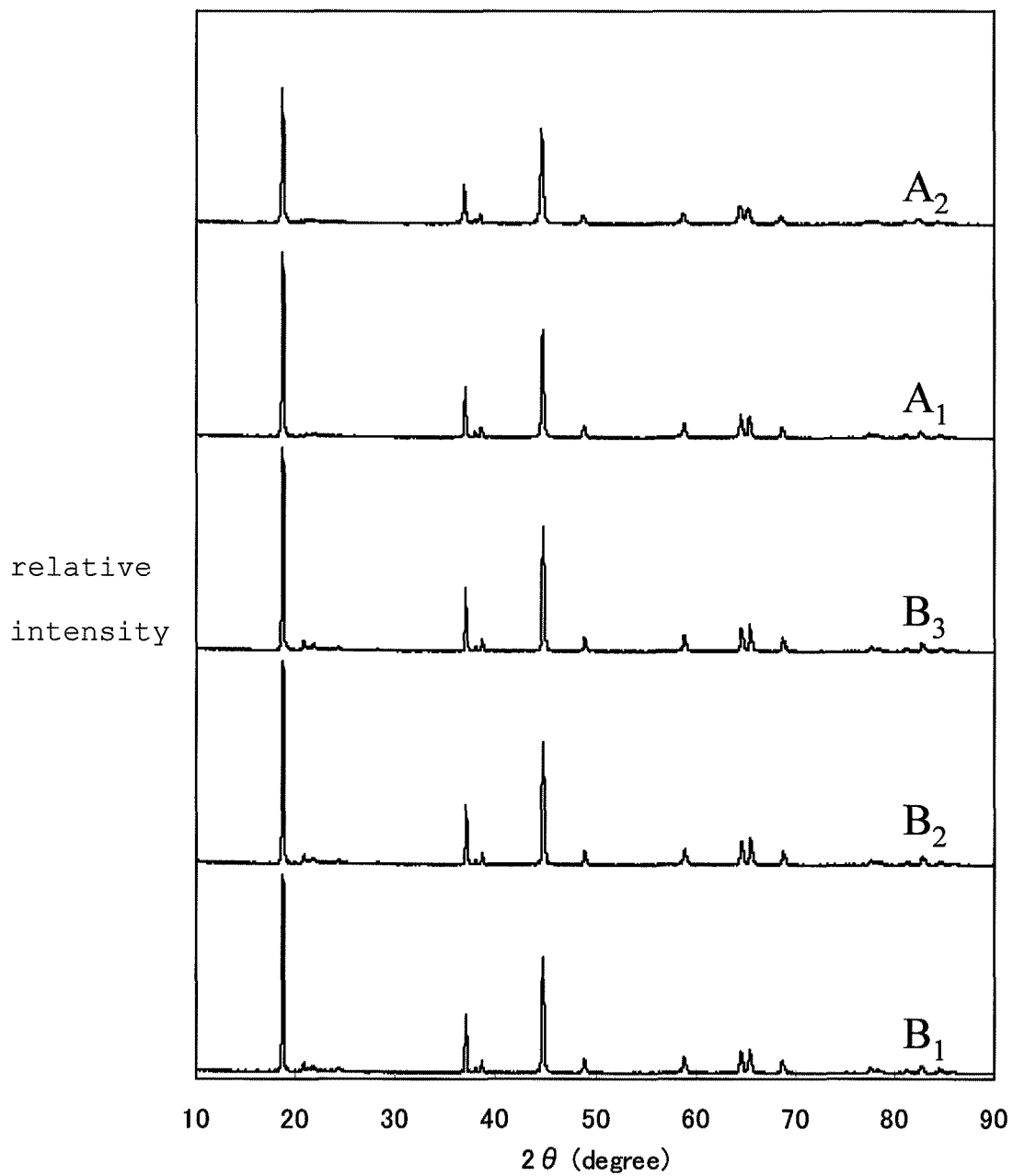
FIG. 4 is a powder X-ray diffraction pattern of a powder in each of Examples 1 to 3 and Comparative Example.

In the powder X-ray diffraction pattern of the powder $A_1$, a diffraction peak (diffraction peak B) showing the maximum intensity could be confirmed at an angle 2θ of 18.7°. However, no diffraction peak (diffraction peak A) was confirmed at angle 2θ ranging from 20° to 23° in the pattern. Also, as a result of Rietveld analysis, the crystal structure of $A_1$ was belonging to hexagonal space group R-3m and the a-axis lattice constant of the hexagonal space group R-3m was 2.852 Å. The powder X-ray diffraction pattern is shown in FIG. 4.

2. Charge-discharge Test of the Lithium Secondary Battery in the Charge-Discharge Condition 1

Using the powder $A_1$, a plate type battery was manufactured and subjected to a charge-discharge cycle test repeatedly. As a result, the discharge capacities (mAh/g) in the 1st cycle, 10th cycle, 20th cycle and 30th cycle were 113, 132, 154 and 169 respectively, and the capacity retentions (%) were 100, 117, 136 and 149 respectively.

3. Charge-discharge Test of the Lithium Secondary Battery in the Charge-Discharge Condition 2

Using the powder $A_1$, a plate type battery was manufactured and subjected to a charge-discharge cycle test repeatedly. As a result, the discharge capacities (mAh/g) in the 1st cycle, 3rd cycle, 5th cycle and 10th cycle were 165, 178, 178 and 178 respectively, and the capacity retentions (%) were 100, 108, 108 and 108 respectively.

When the particles of the powder $A_1$ were subjected to electron beam measurement, only a diffraction point which may belong to the space group R-3m was observed.

COMPARATIVE EXAMPLE 2

1. Production of a Lithium Composite Metal Oxide

A powder $A_2$ was obtained in the same manner as in Comparative Example 1 except that no cobalt (II) nitrate hexahydrate was used and 26.15 g of nickel (II) chloride hexahydrate and 25.73 g of manganese (II) chloride tetrahydrate were used so that the molar ratio of Ni:Mn was 0.46:0.54.

As a result of the analysis of the composition of the powder $A_2$, it was found that the molar ratio of Li:Ni:Mn was 1.32:0.46:0.54. Also, the BET specific surface area of $A_2$ was 5.7 m$^2$/g.

In the powder X-ray diffraction pattern of the powder $A_2$, a diffraction peak (diffraction peak B) showing the maximum intensity was confirmed at an angle 2θ of 18.80°. However, no diffraction peak (diffraction peak A) could be confirmed at angle 2θ ranging from 20° to 23° in the pattern. Also, as a result of Rietveld analysis, the crystal structure of $A_2$ was belonging to hexagonal space group R-3m and the a-axis lattice constant of the hexagonal space group R-3m was 2.857 Å. The powder X-ray diffraction pattern is shown in FIG. 4.

2. Charge-discharge Test of the Lithium Secondary Battery in the Charge-Discharge Condition 1

Using the powder $A_2$, a plate type battery was manufactured and subjected to a charge-discharge cycle test repeatedly. As a result, the discharge capacities (mAh/g) in the 1st cycle, 10th cycle, 20th cycle and 30th cycle were 112, 127, 143 and 154 respectively, and the capacity retentions (%) were 100, 113, 128 and 137 respectively.

3. Charge-discharge Test of the Lithium Secondary Battery in the Charge-Discharge Condition 2

Using the powder $A_2$, a plate type battery was manufactured and subjected to a charge-discharge cycle test repeatedly. As a result, the discharge capacities (mAh/g) in the 1st cycle, 3rd cycle, 5th cycle and 10th cycle were 145, 171, 173 and 175 respectively, and the capacity retentions (%) were 100, 119, 119 and 121 respectively.

When the particles of the powder $A_2$ were subjected to electron beam measurement, only a diffraction point which may belong to the space group R-3m was observed.

EXAMPLE 1

1. Production of a Lithium Composite Metal Oxide

The process until the hydrothermally treated product was obtained was carried out in the same manner as in Comparative Example 1. The hydrothermally treated product was taken out of the autoclave and then subjected to decantation using distilled water. The decanted product was then filtered and washed with water, followed by drying at 100° C. to obtain a dried product.

In a dry mixing, 2.0 g of the above dried product and 0.894 g of lithium hydroxide monohydrate were mixed using an agate mortar to obtain a mixture. Then, the mixture was then placed in an alumina burning container, followed by baking at 800° C. in the air for 6 hours by using an electric furnace. The baked product was cooled to room temperature, pulverized and washed by decantation using distilled water, followed by filtration and the obtained residue was dried at 100° C. for 8 hours to obtain a powder $B_1$.

As a result of the analysis of the composition of the powder $B_1$, it was found that the molar ratio of Li:Ni:Mn:Co was 1.52:0.41:0.49:0.10. Also, the BET specific surface area of $B_1$ was 4.6 m$^2$/g.

In the powder X-ray diffraction pattern of the powder $B_1$, a diffraction peak (diffraction peak B) showing the maximum intensity could be confirmed at an angle 2θ of 18.80. In the pattern, diffraction peaks (diffraction peak A) observed at an angle 2θ ranging from 20° to 23° were confirmed at an angle 2θ of 20.9°. When the intensity of the diffraction peak B was set to 100, the intensity of the diffraction peak A was 3.9. Also, as a result of Rietveld analysis, the crystal structure of $B_1$ was belonging to both hexagonal space group R-3m and monoclinic space group C2/m. The a-axis lattice constant of the hexagonal space group R-3m was 2.849 Å. The powder X-ray diffraction pattern is shown in FIG. 4.

2. Charge-Discharge Test of the Lithium Secondary Battery in the Charge-Discharge Condition 1

Using the powder $B_1$, a plate type battery was manufactured and subjected to a charge-discharge cycle test repeatedly. As a result, the discharge capacities (mAh/g) in the 1st cycle, 10th cycle, 20th cycle and 30th cycle were 106, 125, 150 and 172 respectively, and the capacity retentions (%) were 100, 118, 142 and 162 respectively, which were all higher than those of the powers $A_1$ and $A_2$.

3. Charge-Discharge Test of the Lithium Secondary Battery in the Charge-Discharge Condition 2

Using the powder $B_1$, a plate type battery was manufactured and subjected to a charge-discharge cycle test repeatedly. As a result, the discharge capacities (mAh/g) in the 1st cycle, 3rd cycle, 5th cycle and 10th cycle were 170, 202, 204 and 208 respectively, and the capacity retentions (%) were 100, 119, 120 and 122 respectively, which were all higher than those of $A_1$ and $A_2$.

Figure 2:
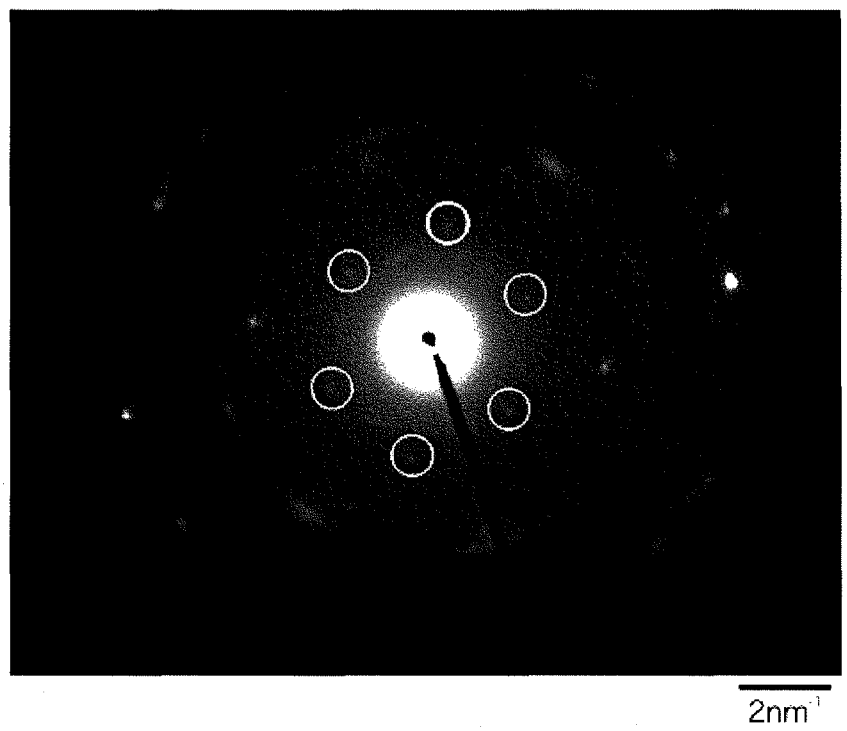
FIG. 2 is an electron beam diffraction image of a powder in Example 1.

The particles constituting the powder $B_1$ were subjected to TEM observation and electron beam diffraction measurement. A photograph (bright-field image) obtained by the TEM observation is shown in FIG. 1. Then, the powder B1 was subjected to electron beam diffraction measurement, to confirm the presence of a diffraction point which may belong to the space group C2/m together with the diffraction point which may belong to the space group R-3m. The electron beam diffraction image at this time is shown in FIG. 2. The diffraction point surrounded by the white circle mark in FIG. 2 was the diffraction point belonging to the space group C2/m.

Figure 3:
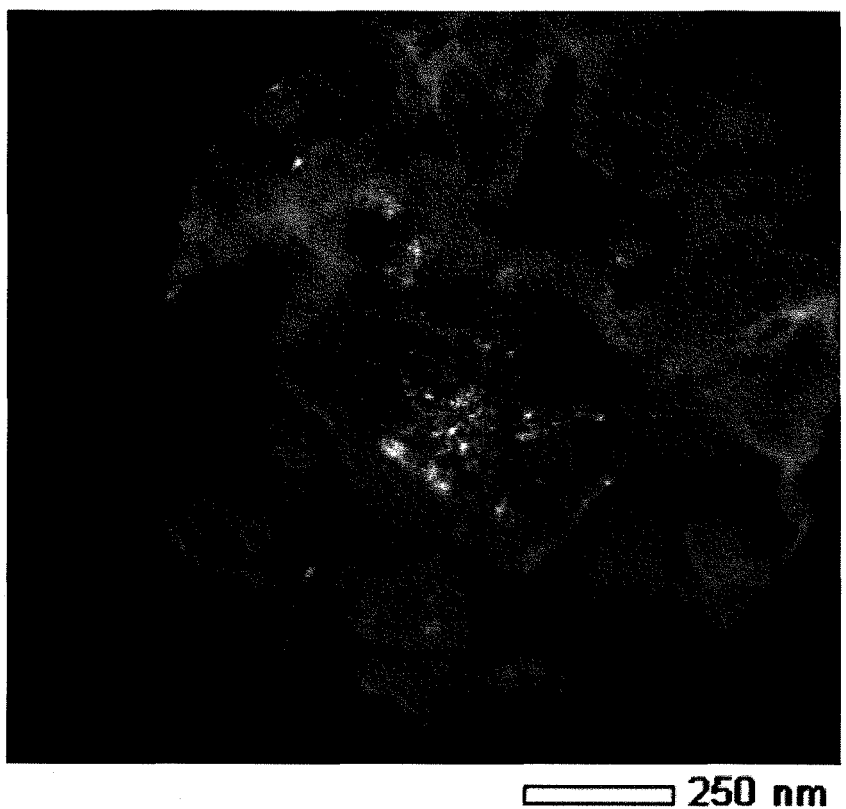
FIG. 3 is a TEM photograph (dark field image) of a powder in Example 1.

Then, a TEM photograph of a dark-field image was taken based on the diffraction point which may belong to the space group C2/m. FIG. 3 shows the TEM photograph of a dark-field image. In FIG. 3, the regions seen like white dots are those having the crystal structures which may belong to the space group C2/m. Also, the regions which are not shown by white dots are those having the crystal structures which may belong to the space group R-3m, to find that the particles had both of a crystal structure belonging to the space group R-3m and a crystal structure belonging to the space group C2/m in each particle.

EXAMPLE 2

1. Production of a Lithium Composite Metal Oxide

A powder $B_2$ was obtained in the same manner as in Example 1 except that 2.0 g of the dried product and 1.79 g of lithium hydroxide monohydrate were mixed in a dry mixing by using an agate mortar to obtain a mixture.

As a result of the analysis of the composition of the powder $B_2$, it was found that the molar ratio of Li:Ni:Mn:Co was 1.55:0.40:0.50:0.10. Also, the BET specific surface area of $B_2$ was 4.0 m$^2$/g.

In the powder X-ray diffraction pattern of the powder $B_2$, a diffraction peak (diffraction peak B) showing the maximum intensity could be confirmed at an angle 2θ of 18.8°. In the pattern, diffraction peaks (diffraction peak A) observed at an angle 2θ range from 20° to 23° were confirmed at an angle 2θ of 20.9°. When the intensity of the diffraction peak B was set to 100, the intensity of the diffraction peak A was 3.8. Also, as a result of Rietveld analysis, the crystal structure of $B_2$ was belonging to both hexagonal space group R-3m and monoclinic space group C2/m. The a-axis lattice constant of the hexagonal space group R-3m was 2.847 Å. The powder X-ray diffraction pattern is shown in FIG. 4.

2. Charge-Discharge Test of the Lithium Secondary Battery in the Charge-Discharge Condition 1

Using the powder $B_2$, a plate type battery was manufactured and subjected to a charge-discharge cycle test repeatedly. As a result, the discharge capacities (mAh/g) in the 1st cycle, 10th cycle, 20th cycle and 30th cycle were 94, 126, 163 and 182 respectively, and the capacity retentions (%) were 100, 134, 173 and 194 respectively, which were all higher than those of the powers $A_1$ and $A_2$.

3. Charge-Discharge Test of the Lithium Secondary Battery in the Charge-Discharge Condition 2

Using the powder $B_2$, a plate type battery was manufactured and subjected to a charge-discharge cycle test repeatedly. As a result, the discharge capacities (mAh/g) in the 1st cycle, 3rd cycle, 5th cycle and 10th cycle were 154, 202, 203 and 204 respectively, and the capacity retentions (%) were 100, 131, 132 and 132 respectively, which were all higher than those of $A_1$ and $A_2$.

EXAMPLE 3

1. Production of a Lithium Composite Metal Oxide

A powder $B_3$ was obtained in the same manner as in Example 1 except that 2.0 g of the dried product and 3.58 g of lithium hydroxide monohydrate were mixed in a dry mixing by using an agate mortar to obtain a mixture.

As a result of the analysis of the composition of the powder $B_3$, it was found that the molar ratio of Li:Ni:Mn:Co was 1.57:0.40:0.49:0.11. Also, the BET specific surface area of $B_3$ was 3.8 m$^2$/g.

In the powder X-ray diffraction pattern of the powder $B_3$, a diffraction peak (diffraction peak B) showing the maximum intensity could be confirmed at an angle 2θ of 18.8°. In the pattern, diffraction peaks (diffraction peak A) observed at an angle 2θ ranging from 20° to 23° could be confirmed at an angle 2θ of 20.8°. When the intensity of the diffraction peak B was set to 100, the intensity of the diffraction peak A was 4.2. Also, as a result of Rietveld analysis, the crystal structure of $B_3$ was belonging to both hexagonal space group R-3m and monoclinic space group C2/m. The a-axis lattice constant of the hexagonal space group R-3m was 2.848 Å. The powder X-ray diffraction pattern is shown in FIG. 4.

2. Charge-Discharge Test of the Lithium Secondary Battery in the Charge-Discharge Condition 1

Using the powder $B_3$, a plate type battery was manufactured and subjected to a charge-discharge cycle test repeatedly. As a result, the discharge capacities (mAh/g) in the 1st cycle, 10th cycle, 20th cycle and 30th cycle were 92, 113, 141 and 165 respectively, and the capacity retentions (%) were 100, 123, 153 and 179 respectively, which were all higher than those of the powers $A_1$ and $A_2$.

3. Charge-Discharge Test of the Lithium Secondary Battery in the Charge-Discharge Condition 2

Using the powder $B_3$, a plate type battery was manufactured and subjected to a charge-discharge cycle test repeatedly. As a result, the discharge capacities (mAh/g) in the 1st cycle, 3rd cycle, 5th cycle and 10th cycle were 145, 197, 197 and 197 respectively, and the capacity retentions (%) were 100, 136, 136 and 136 respectively which were all higher than those of $A_1$ and $A_2$.

EXAMPLE 4

1. Production of a Lithium Composite Metal Oxide

A hydrothermally treated product (molar ratio of Ni:Mn:Fe=0.41:0.49:0.10) was obtained in the same manner as in Comparative Example 1 except that 6.76 g of iron (III) chloride hexahydrate was used in place of 7.28 g of cobalt (II) nitrate hexahydrate. The hydrothermally treated product was taken out of the autoclave and then subjected to decantation using distilled water. The decanted product was filtered and washed with water, followed by drying at 100° C. to obtain a dried product.

In a dry mixing, 2.0 g of the above dried product and 1.79 g of lithium hydroxide monohydrate were mixed using an agate mortar to obtain a mixture. Then, the mixture was then placed in an alumina burning container, followed by baking at 800° C. in the air for 6 hours by using an electric furnace. The baked product was cooled to room temperature, pulverized and washed by decantation using distilled water, followed by filtration and the obtained residue was dried at 100° C. for 8 hours to obtain a powder $B_4$.

As a result of the analysis of the composition of the powder $B_4$, it was found that the molar ratio of Li:Ni:Mn:Fe was 1.51:0.41:0.49:0.10. Also, the BET specific surface area of $B_4$ was 4.4 m$^2$/g.

Figure 5:
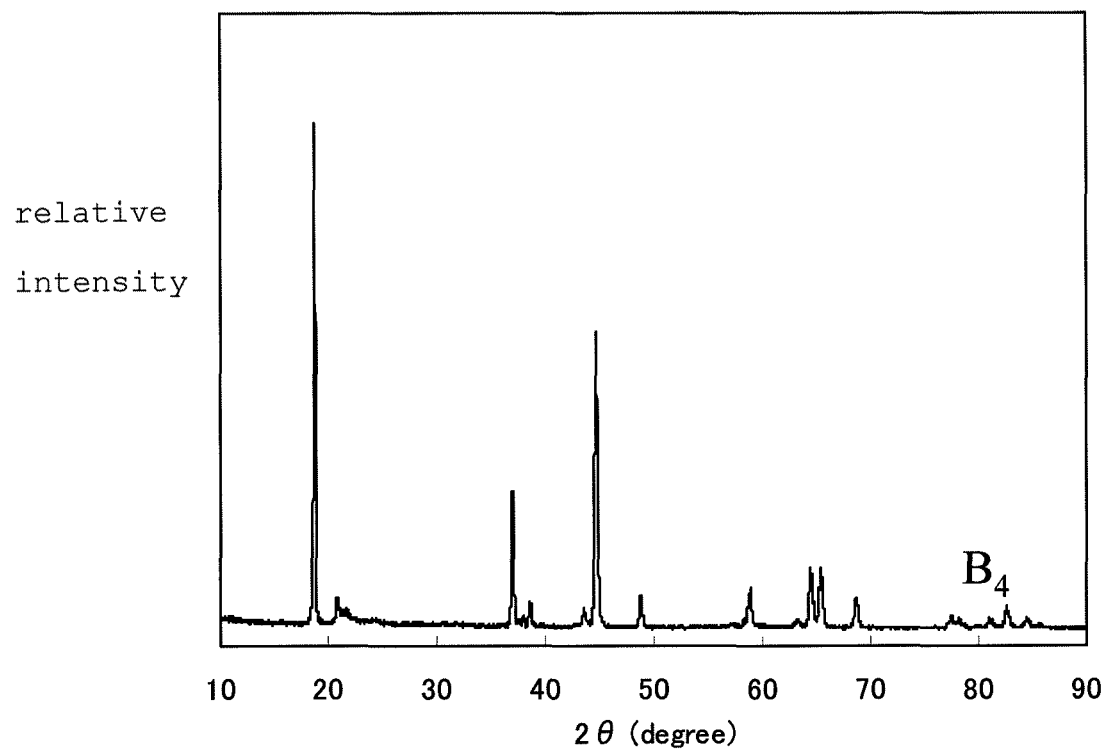
FIG. 5 is a powder X-ray diffraction pattern of a powder in Example 4.

In the powder X-ray diffraction pattern of the powder $B_4$, a diffraction peak (diffraction peak B) showing the maximum intensity was confirmed at an angle 2θ of 18.7°. In the pattern, diffraction peaks (diffraction peak A) observed at an angle 2θ ranging from 20° to 23° were confirmed at an angle 2θ of 20.8°. When the intensity of the diffraction peak B was set to 100, the intensity of the diffraction peak A was 4.8. Also, as a result of Rietveld analysis, the crystal structure of $B_1$ was belonging to both hexagonal space group R-3m and monoclinic space group C2/m. The a-axis lattice constant of the hexagonal space group R-3m was 2.851 Å. The powder X-ray diffraction pattern is shown in FIG. 5.

2. Charge-Discharge Test of the Lithium Secondary Battery in the Charge-Discharge Condition 1

Using the powder $B_4$, a plate type battery was manufactured and subjected to a charge-discharge cycle test repeatedly. As a result, the discharge capacities (mAh/g) in the 1st cycle, 10th cycle, 20th cycle and 30th cycle were 82, 133, 161 and 165 respectively, and the capacity retentions (%) were 100, 161, 196 and 201 respectively, which were all higher than those of the powers $A_1$ and $A_2$.

3. Charge-Discharge Test of the Lithium Secondary Battery in the Charge-Discharge Condition 2

Using the powder $B_4$, a plate type battery was manufactured and subjected to a charge-discharge cycle test repeatedly. As a result, the discharge capacities (mAh/g) in the 1st cycle, 3rd cycle, 5th cycle and 10th cycle were 125, 180, 176 and 176 respectively, and the capacity retentions (%) were 100, 143, 140 and 140 respectively, which were all higher than those of $A_1$ and $A_2$.

PRODUCTION EXAMPLE 1

Production of a Laminated Porous Film (1) Production of a Coating Solution

After 272.7 g of calcium chloride was dissolved in 4200 g of NMP, 132.9 g of paraphenylenediamine was added thereto and was completely dissolved in the solution. 243.3 g of terephthalic acid dichloride was gradually added to the obtained solution to polymerize, thereby obtaining a para-aramide, which was further diluted with NMP to obtain a para-amide solution (A) having a concentration of 2.0% by weight. 2 g of an alumina powder (a) (trade name: Alumina C, manufactured by Nippon Aerosil Co., Ltd., average particle diameter: 0.02 μm) and 2 g of an alumina powder (b) (Sumicorundum AA03, manufactured by Sumitomo Chemical Co., Ltd., average particle diameter: 0.3 μm) were added as a filler to 100 g of the obtained para-aramide solution in a total amount of 4 g, followed by mixing. The mixture was treated three times with a nanomizer, further filtered using a 100 mesh wire screen and defoamed under reduced pressure to produce a slurry-like coating solution (B). The weight of the alumina powder (filler) was 67% by weight based on the total amount of the para-aramide and alumina powder.

(2) Production and Evaluation of a Laminated Porous Film

A polyethylene porous film (film thickness: 12 μm, air permeability: 140 sec/100 cc, average pore diameter: 0.1 μm, porosity: 50%) was used as the shut-down layer. The polyethylene porous film was secured onto a PET film having a thickness of 100 μm and the slurry-like coating solution (B) was applied onto the porous film by a bar coater manufactured by Tester Sangyo Co., Ltd. The porous film integrated with the PET film applied thereto was immersed as it was in water which was a poor solvent and a para-aramide porous film (heat resistant layer) was precipitated. Then, the solvent was removed by drying to obtain a laminated porous film 1 in which the heat-resistant layer and the shut-down layer were laminated. The laminated porous film 1 had a thickness of 16 μm and the para-aramide porous film (heat-resistant layer) had a thickness of 4 μm. The laminated porous film 1 had an air permeability of 180 sec/100 cc and a porosity of 50%. When the cross section of the heat-resistant layer in the laminated porous film 1 was observed by a scanning type electron microscope (SEM), it was found that the heat-resistant layer had relatively small micropores having a diameter of about 0.03 μm to 0.06 μm and relatively large micropores having a diameter of about 0.1 μm to 1 μm. In this regard, the laminated porous film was evaluated in the following method.

Evaluation of the Laminated Porous Film (A) Measurement of Thickness

The thickness of the laminated porous film and the thickness of the shut-down layer were measured according to JIS standard (K7130-1992). Further, as the thickness of the heat-resistant layer, the value of thickness given by subtracting the thickness of the shut-down layer from the thickness of the laminated porous film was adopted.

(B) Measurement of the Air Permeability by the Gurley Method

The air permeability of the laminated porous film was measured by a digital timer type Gurley type densometer manufactured by Yasuda Seiki Seisakusho Ltd. according to JIS P8117.

(C) Porosity

A sample of the obtained laminated porous film was cut into a 10 cm×10 cm square to measure the weight W (g) and thickness D (cm) of the cut film. The weight (Wi) of each layer in the sample was found and the volume of each layer was found from Wi and the true specific gravity (g/cm$^3$) of the material of each layer, thereby finding the porosity (vol %).

Porosity (vol %)=100×{1−(W1/True specific gravity 1+W2/True specific gravity 2+ . . . +Wn/True specific gravity n)/(10×10×D)}

If the laminated porous film obtained in Production Example 1 is used as the separator in each of Examples 1 to 4, a lithium secondary battery can be obtained which can be more improved in capacity retention and also has a high thermal breakdown temperature of the film.

The invention claimed is:

1. A lithium composite metal oxide comprising Li and at least one transition metal element, wherein
    at least one lithium composite metal oxide particle constituting the lithium composite metal oxide has both hexagonal and monoclinic crystal structures,
    the amount (mol) of Li is 1.4 or more and 1.7 or less based on the total amount (mol) of the transition metal elements,
    the monoclinic crystal structure is a crystal structure belonging to the space group C2/m, the hexagonal crystal structure is a crystal structure belonging to the space group R-3m, and
    the lithium composite metal oxide comprising Li and at least one transition metal element is a lithium composite metal oxide comprising Li and at least one element selected from Ni, Co, Mn and Fe.

2. A lithium composite metal oxide comprising Li, Ni and M (where, M represents one or more kinds of transition metal elements selected from the group consisting of Mn, Co and Fe), having a diffraction peak (diffraction peak A) at an angle 2θ in a range from 20° to 23° in a powder X-ray diffraction pattern of a lithium composite metal oxide which is obtained by powder X-ray diffraction measurement made in the condition that CuKα is used as a radiation source and the measurement range of the diffraction angle 2θ is in a range from 10° to 90°,
    wherein the amount (mol) of Li is 1.4 or more and 1.7 or less based on the total amount (mol) of the transition metal elements, at least one lithium composite metal oxide particle constituting the lithium composite metal oxide has both hexagonal and monoclinic crystal structures, the monoclinic crystal structure is a crystal structure belonging to the space group C2/m, and the hexagonal crystal structure is a crystal structure belonging to the space group R-3m.

3. The lithium composite metal oxide according to claim 2, wherein the intensity of the diffraction peak A is 3 or more and 10 or less when the diffraction peak (diffraction peak B) having the maximum intensity is set to 100 in said powder X-ray diffraction pattern.

4. The lithium composite metal oxide according to claim 2, having the hexagonal crystal structure and an a-axis lattice constant in Rietveld analysis of the crystal structure is 2.840 Å or more and 2.851 Å or less.

5. The lithium composite metal oxide according to claim 3, having the hexagonal crystal structure and an a-axis lattice constant in Rietveld analysis of the crystal structure is 2.840 Å or more and 2.851 Å or less.

6. A lithium composite metal oxide comprising Li and at least one transition metal element, wherein
    at least one lithium composite metal oxide particle constituting the lithium composite metal oxide has both hexagonal and monoclinic crystal structures,
    the amount (mol) of Li is 1.4 or more and 1.7 or less based on the total amount (mol) of the transition metal elements,
    the monoclinic crystal structure is a crystal structure belonging to the space group C2/m, the hexagonal crystal structure is a crystal structure belonging to the space group R-3m, and
    the lithium composite metal oxide comprising Li and at least one transition metal element is a lithium composite metal oxide comprising Li, Ni and M (where, M represents one or more kinds of transition metal elements selected from the group consisting of Mn, Co and Fe).

7. The lithium composite metal oxide according to claim 6, wherein the amount (mol) of Li is 1.4 or more and 1.7 or less based on the total amount (mol) of Ni and M.

8. The lithium composite metal oxide according to claim 6, wherein the amount (mol) of M exceeds 0 and is 0.9 or less based on the total amount (mol) of Ni and M.

9. The lithium composite metal oxide according to claim 6, wherein the amount (mol) of Co is 0 or more and 0.4 or less based on the total amount (mol) of M.

10. The lithium composite metal oxide according to claim 6, wherein M is Mn and/or Co.

11. The lithium composite metal oxide according to claim 6, wherein M is Mn.

12. A positive electrode active material for a nonaqueous electrolyte secondary battery comprising the lithium composite metal oxide of claim 6.

13. A positive electrode for a nonaqueous electrolyte secondary battery comprising the positive electrode material for a nonaqueous electrolyte secondary battery of claim 12.

14. A nonaqueous electrolyte secondary battery comprising the positive electrode for a nonaqueous electrolyte secondary battery of claim 13.

15. The nonaqueous electrolyte secondary battery according to claim 14, further comprising a separator.

16. The nonaqueous electrolyte secondary battery according to claim 15, wherein the separator is made of a laminated porous film obtained by laminating a heat-resistant layer containing a heat-resistant resin and a shut-down layer containing a thermoplastic resin.

17. A method for charging and discharging a nonaqueous electrolyte secondary battery, charging the nonaqueous electrolyte secondary battery of claim 14 at a voltage which reaches a maximum voltage ranging from 4.0 V to 5.0 V and discharging at a voltage which drops to a minimum voltage ranging from 2.0 V to 3.0 V at a temperature ranging from 40° C. to 70° C.

18. The method for charging and discharging a nonaqueous electrolyte secondary battery according to claim 17, charging and discharging the nonaqueous electrolyte secondary battery of claim 14 by a method including the following steps (1) and (2) at a temperature ranging from 40° C. to 70° C.:
(1) charging the nonaqueous electrolyte secondary battery at a voltage which reaches a maximum voltage ranging from 4.3 V to 4.8 V and discharging at a voltage which drops to a minimum voltage ranging from 2.0 V to 3.0 V; and
(2) charging the nonaqueous electrolyte secondary battery at a voltage which reaches a maximum voltage ranging from 4.0 V to 4.4 V and discharging at a voltage which drops to a minimum voltage ranging from 2.0 v to 3.0 V.

19. A nonaqueous electrolyte secondary battery charged and discharged by the method for charging and discharging a nonaqueous electrolyte secondary battery of claim 17.

\* \* \* \* \*